United States Patent [19]

Orman

[11] 3,877,964

[45] Apr. 15, 1975

[54] TRANSFER PRINTING PROCESS AND PRODUCTS THEREOF

[75] Inventor: Richard John Orman, Welwyn Garden City, England

[73] Assignee: Imperial Chemical Industries Limited, London, England

[22] Filed: Nov. 1, 1973

[21] Appl. No.: 411,844

[30] Foreign Application Priority Data

Nov. 16, 1972 United Kingdom............... 52938/72

[52] U.S. Cl. ...................... 428/195; 8/2.5; 264/45; 264/48; 117/106 R; 428/315; 428/322; 161/146; 161/160
[51] Int. Cl.............................................. D06p 5/00
[58] Field of Search . 117/37 R, 38, 106 R, 161 UB; 161/146, 160, 161; 8/2.5, DIG. 7, 18

[56] References Cited

UNITED STATES PATENTS 3,654,193    4/1972    Seiner............................ 117/36.7 X Primary Examiner—Thomas J. Herbert, Jr.
Assistant Examiner—Bruce H. Hess
Attorney, Agent, or Firm—Cushman, Darby & Cushman

[57] ABSTRACT

Decorated articles are produced by casting a water-extended acrylic polymer, drying at least a surface, decorating the surface by transfer printing using sublimable dyestuffs, and preferably fusing the surface to form a non-cellular skin.

9 Claims, No Drawings

3,877,964

TRANSFER PRINTING PROCESS AND PRODUCTS THEREOF

The invention relates to the production of coloured articles formed from a synthetic thermoplastic material.

Transfer printing methods have previously been used for printing textiles, and comprise first printing an inert support (e.g., paper) with one or more sublimable dyestuffs, generally with a cellulosic or similar binder, placing the printing support against the textile, and applying heat to cause the dyestuffs to vaporise and penetrate the textile. The inert supports with their sublimable dyestuffs are referred to herein as transfer prints.

We have found, however, that such methods are not generally effective for decorating some solid polymeric articles. On attempting to transfer the dyes of a transfer print sold for printing textiles, onto a clear acrylic sheet with a view of subsequently shaping the sheet to form a decorated article, we found that the acrylic sheet was not sufficiently receptive. The colours produced were pale and thin, and they appeared to have very little penetrating power. Some of the dyes would readily rub off the surface, while others penetrated to such a small degree that gentle abrasion of the surface was sufficient to remove the print. After the printing process examination of the paper supporting the dyes showed that much of the print had remained on the paper. The present invention is concerned with polymerisation of acrylic monomers to form polymeric material in such a manner that they become receptive to transfer dyes and may be printed using a transfer process.

According to the present invention, a process for forming a decorated polymeric material comprises polymerising the continuous phase of an emulsion having an aqueous disperse phase and a continuous phase of acrylic monomer to form a water-filled cellular material, removing the water from at least a part of the surface of the material, and decorating the cellular material by heating a transfer print containing one or more sublimable dyes adjacent said part of the surface to a temperature above the sublimation temperature of the dyes so as to vaporise and transfer the dyes to said surface.

The cellular surface of the polymer is weak and prone to damage by rupture of the cell walls unless reinforced in some way. Accordingly a preferred process is one which comprises also the step of applying heat and pressure to the part of the surface decorated during the process, so as to raise its temperature above the softening point of the polymer and fuse the surface layer thereof, whereby the fused layer on cooling forms a non-cellular skin.

It is generally preferred to transfer the print to the polymer surface before fusing the surface layer to form the skin. In this way the surface of the skin (which may be an attractive feature of the finished article) is not impaired by a subsequent heating cycle. However, it is possible to adequately transfer the dye after forming the skin although the colours generally appear a little less brilliant and the surface may lose some of its gloss. Indeed the dyes can surprisingly be made to transfer far more readily to a non-cellular skin previously formed on a water-extended polymethyl methacrylate, than to the clear cast acrylic sheet described hereinbefore.

Once a print has been transferred, it is preferable to ensure that the temperature subsequently remains below the sublimation temperature of the dyes, otherwise diffusion of the print may occur. Consequently where the print is transferred before the skin is formed, it is generally preferred to use dyes which sublime at temperatures in excess of the softening temperature of the polymer i.e., material so that after the print has been transferred the skin may be formed by fusion of the surface layer at a temperature below the sublimation temperature of the dyes. Similarly where thermoforming of the printed material is required, a preferred process is one comprising thermoforming a printed sheet of the polymer at a temperature below the sublimation temperature of the dyes with which it is printed, whereby diffusion of the print will not occur during thermoforming.

Where dyes are used which have very high sublimation temperatures, dye transfer may be assisted by carrying out the operation under conditions of reduced pressure. This is particularly advantageous when decomposition of the polymeric material is likely to occur at the temperature required for sublimation under ambient pressures.

The preferred acrylic monomer is methyl methacrylate. Polymethyl methacrylate is a hard structural material with a clarity which can provide a particularly attractive clear skin, and the relative ease with which water will diffuse through the polymer and related copolymers, permits a ready and rapid removal of the water from the cellular structure prior to printing and skin formation. The cell structure of water-extended polymethyl methacrylate can be very fine and uniform when suitable emulsifiers are used. Typically the cells are less than 50 $\mu$m in diameter with a major proportion of the cells having diameters less than 10 $\mu$m. Furthermore, the softening point of polymethyl methacrylate is well below the sublimation temperature of many useful dyes while being sufficiently high for the formed article not to be softened by hot water. This property is particularly useful where a skin is to be formed on the printed material, and/or where a sheet of the printed material is to be thermoformed into a shaped article.

The polymeric material may be made to flow more easily during skin formation by using high quantities of catalyst during polymerisation so as to produce a low molecular weight material, or by the copolymerisation of suitable modifiers. Suitable modifiers for methyl methacrylate polymers include acrylates, particularly those providing the polymer chain with bulky side groups, such as 2-ethyl hexyl acrylate which may suitably be used in quantities of from 5 to 20% by weight of the total monomers, preferably within the range of 10 to 15% by weight. Cross-linking will inhibit flow during skin formation, and so comonomers or additives which would contribute to cross-linking are preferably avoided or minimised where a glossy skin is required.

The oil phase may contain, if desired, polymer dissolved in the monomer, e.g., polymethylmethacrylate dissolved in the methyl methacrylate. Such solutions may be useful in speeding the rate of the polymerisation reactions, but generally they are not necessary and it is therefore preferable to omit them.

When printing at temperatures above the softening temperature of the polymeric material, it is generally preferred to apply only a minimum of pressure to the print during the heating stage. It is important for high definition to hold the print firmly against the part of the surface being printed, by excessive pressure may cause the surface cellular structure to collapse to an undesirable extent, and may make it difficult to remove the inert carrier of some transfer prints.

Where the printed polymeric material is in the form of a sheet, the skin strengthens the surface and overcomes the tendency for the outer cells to rupture during any subsequent thermoforming of the sheet, e.g., by vacuum forming techniques. We find that sheet having a skin on both sides so as to form an integral composite sandwich of non-cellular/cellular/non-cellular structure, can be deeply drawn into complex shapes to produce articles having remarkably constant thickness. Printed and skinned water-extended thermoplastic materials are well suited to a large variety of uses especially in the domestic and commercial markets where aesthetic appeal is of considerable importance. Such applications include for example wall tiles, coffee table tops and similar occasional furniture, sanitary ware such as hand basins and baths, small doors for cabinets or larger doors for rooms or wardrobes, screens or partitions, and trinket boxes, ottomans or the like.

The invention is illustrated by the following Examples in which Examples 1 and 2 describe the method of the present invention whereas Example 3 is provided for comparative purposes.

EXAMPLE 1

This Example illustrates the production of a decorated hand basin by the steps of forming a sheet of suitable water-extended polymeric material, transfer printing the material, forming a skin and thermoforming the skinned sheet to the desired shape.

The continuous oil phase of an emulsion consisted of methyl methacrylate with 2% ethyl cellulose (sold by the Hercules Powder Company Limited as grade N-10), 0.07% glycol dimethacrylate and 1.5% tert-butyl perpivolate where the quantities are percentages by weight of the methyl methacrylate. The oil was placed in a lagged box, and water at a temperature of 56°C was added at the rate of 10 litre min $^{-1}$, while the oil was being stirred using a 76 mm poppy head stirrer at 1,300 r.p.m. After the required water had been added, stirring was continued for a further 10 min at the same speed to produce an emulsion comprising 75% by weight of water as the disperse phase. The temperature of the emulsion was about 45°C. The box was then subdivided by silane-treated glass sheets 13 mm apart, closed with an insulating cover, and left for the oil phase to cure.

After 24 hours the box was opened and the sheets removed. They were still warm, with temperatures estimated as being in the region of 70°C. The demoulded sheets were then dried in an oven at 110°C for a further 24 hours. On removal from the oven they had a fine cellular structure giving the sheets a white opaque appearance. Before further processing, the sheets were allowed to completely cool to ambient temperatures.

The decoration was provided by a transfer print sold by Imperial Chemical Industries Limited under the name "ICI Inprints" and comprised a sublimable dye supported on paper, and covered by a tack layer.

The dried cellular sheet was placed in a press and the transfer print placed on top with the dyes next to the surface of the sheet. The platen of the press was heated to 200°C, and was brought down onto the paper for 30 sec using only its own weight. This gave a pressure of only about 2 p.s.i. The printed sheet was then removed from the press, the support paper removed from the surface, and the sheet cooled to ambient temperature. Only very slight change in thickness of the sheet occurred during printing.

To form the skin, the printed sheet was pressed between heated glazing plates at a temperature of 175°C until the plates were prevented from further movement by stops 6 mm apart. The pressure required was between 500 and 600 p.s.i., and the operation took 1 to 1.5 min. After pressing, the pressure was released, and the sheet removed from the press while still hot.

To form the wash basin, the printed and glazed sheet was heated in an oven to an even temperature of 170°C, placed on a vacuum forming mould and vacuum applied to conform the softened sheet to the shape of the mould. After cooling, the basin was removed from the mould and placed in an oven to anneal, the temperature being maintained at 85°C for 4 hours, and then allowed to cool slowly, the basin being removed after a total of 24 hours. On removal from the annealing oven, the basin had a printed decoration with good depth of colour, and a hard, non-cellular skin whose surface had an attractive satin finish.

EXAMPLE 2

This Example describes the production of doors suitable for built-in kitchen cabinets, having an integral decoration within the surface layers.

The monomers of the continuous oil phase of the emulsion were methyl methacrylate (90% by weight) and 2-ethyl hexyl acrylate (10% by weight). The oil phase also contained 1.5% tert-butyl perpivolate and 2% ethyl cellulose (grade N-10 of Hercules Powder Company Limited), where the quantities are percentages by weight of the monomer mixture. The oil was placed in a long, lagged box 60 cm square in section, and warm water added with stirring to form an emulsion, in the manner described in Example I. A more highly extended polymer was required for this application, however, and the water was added until it comprised 80% by weight of the emulsion. Again the box was subdivided by silicone-treated glass sheets, to provide in this Example ten chambers 60 cm × 60 cm × 4 cm, with a 6 mm thick chamber at each end, each chamber being filled with emulsion. An insulating cover was placed on the box and the emulsion left undisturbed for 24 hours while the oil phase cured.

The cured sheets were removed from the box and dried in an oven at 100°C for 24 hours followed by a temperature increase 115°C for a further 7 days. A print was then transferred onto the dry cellular surface of the sheet using a platen at 200°C in the same manner as that described in Example 1.

To add further interest to the printed door, the blank from the printing press was cooled, then placed in an embossing press. This comprised two metal plates slightly larger than the sheets, one plate being flat, the other having six rectangular panels raised above the remaining surface by 6 mm. The plates were maintained at 175°C, and after insertion of the blank, the pressure was gradually raised to 500 p.s.i. until the plates came to stops 19 mm apart, with the raised panels only 13 mm from the flat plate. The operation took 1.5 min. Pressure was then released to 20–50 p.s.i. and the temperature reduced to about 60°C over a period of about 15 min, before the sheet was removed. After removal, the edges of the sheet were trimmed, and hinges and catches secured by wood screws to provide the completed door.

EXAMPLE 3

This Example describes a set of the experiments which we carried out when examining the feasibility of printing polymeric materials other than the fabrics for which transfer printing had been developed.

The polymeric material in each case was 'Perspex' polymethylmethacrylate clear sheet. The transfer prints used were ICI Inprints and several different patterns of various colours were tried, including those used on the wash basins and doors as described in Examples 1 and 2. The sheets of polymer together with the transfer prints having the printed side against the sheet, were placed in a press at 200°C for 30 sec, and a pressure of about 2 p.s.i. applied by the weight of the heated platen, the printing technique being identical to that used for the water-extended polymethylmethacrylate of the previous Examples.

The resultant prints were very pale, and some of the dyes would rub off the surface while others penetrated to such a small degree that gentle abrasion of the surface was sufficient to remove them. Examination of the used support paper showed that much of the dyestuff remained. To compare them with prints made on water-extended polymers, they were viewed with a sheet of white paper held behind the printed sheet. They lacked the deep shade of colour obtained on the water-extended polymer, and so transfer prints were considered unsuitable as a means for printing clear polymethyl methacrylate sheet, at least by using the combination of dyes and transfer techniques which we found were so effective on water-extended polymethyl methacrylate.

I claim:

1. A process for forming a polymeric material comprising polymerising the continuous phase of an emulsion having an aqueous disperse phase and a continuous phase of acrylic monomer which comprises methyl methacrylate to form a water-filled cellular material, removing the water from at least a part of the surface of the material, and decorating the cellular material by heating a transfer print containing at least one sublimable dye adjacent said surface to a temperature above the sublimation temperature of the dye so as to vaporise and transfer the dye to said surface.

2. A process according to claim 1 which comprises applying heat and pressure to the part of the surface decorated during the process, so as to raise its temperature above the softening point of the polymer and fuse the surface layer thereof, whereby the fused layer on cooling forms a non-cellular skin.

3. A process according to claim 2 which comprises transferring the print to the surface of the material before fusing the surface layer to form the skin.

4. A process according to claim 3 wherein the dyes of the transfer print have sublimation temperatures above the softening temperature of the polymer, and the skin is formed by fusion of the surface layer at a temperature below said sublimation temperatures.

5. A process according to claim 2 comprising thermoforming a printed sheet of the thermoplastic material at a temperature below the sublimation temperature of the dyes with which it is printed.

6. A process according to claim 1 in which transfer of the dyes is carried out under conditions of reduced pressure.

7. A process according to claim 1 wherein the acrylic monomer comprises 5 to 20% by weight of 2-ethyl hexyl acrylate.

8. An integral composite sandwich of acrylic polymer, having a cellular core and non-cellular surface skins, at least one of which skins has a decoration therein comprising at least one sublimable dye transferred thereto by application of heat according to the process of claim 1.

9. A sandwich according to claim 8 when forming a door for a kitchen cabinet.

* * * * *